US009311740B2

(12) United States Patent
Lao et al.

(10) Patent No.: US 9,311,740 B2
(45) Date of Patent: Apr. 12, 2016

(54) METHOD FOR ENHANCING RECONSTRUCTED 3-D TOMOSYNTHESIS VOLUME IMAGE

(71) Applicants: Zhiqiang Lao, Rochester, NY (US);
Ravi K. Nareppa, Rochester, NY (US);
Hui Zhao, Pittsford, NY (US)

(72) Inventors: Zhiqiang Lao, Rochester, NY (US);
Ravi K. Nareppa, Rochester, NY (US);
Hui Zhao, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 399 days.

(21) Appl. No.: 13/848,931

(22) Filed: Mar. 22, 2013

(65) Prior Publication Data
US 2013/0257869 A1  Oct. 3, 2013

Related U.S. Application Data

(60) Provisional application No. 61/616,065, filed on Mar. 27, 2012, provisional application No. 61/791,439, filed on Mar. 15, 2013.

(51) Int. Cl.
*G06T 15/08* (2011.01)
*G06T 11/00* (2006.01)

(52) U.S. Cl.
CPC ............... *G06T 15/08* (2013.01); *G06T 11/008* (2013.01); *G06T 2211/436* (2013.01)

(58) Field of Classification Search
None
See application file for complete search history.

(56) References Cited

U.S. PATENT DOCUMENTS

| 6,782,137 | B1 * | 8/2004 | Avinash | 382/254 |
| 7,822,272 | B2 | 10/2010 | Lei | |
| 8,139,828 | B2 | 3/2012 | Huo et al. | |
| 2009/0175562 | A1 * | 7/2009 | Pan et al. | 382/312 |
| 2009/0310845 | A1 * | 12/2009 | Ogawa et al. | 382/132 |
| 2012/0263366 | A1 | 10/2012 | Huo et al. | |

* cited by examiner

*Primary Examiner* — Mark Zimmerman
*Assistant Examiner* — Vu Nguyen

(57) ABSTRACT

A method for providing tomosynthesis 3-D volume image data, executed at least in part on a computer, acquires a number of radiographic projection images of a subject over a range of angles. Reconstructed volume image data is generated from the acquired projection images. A number of regions of interest are defined within the reconstructed volume image data, wherein each region of interest has a number of image voxels. Image voxel data values are conditioned within at least one of the regions of interest to enhance contrast within the at least one region of interest. The conditioned image voxel data values are adjusted within the at least one of the regions of interest according to interpolation with two or more neighboring regions of interest. An image slice having at least a plurality of the adjusted image voxel data values is displayed.

20 Claims, 22 Drawing Sheets

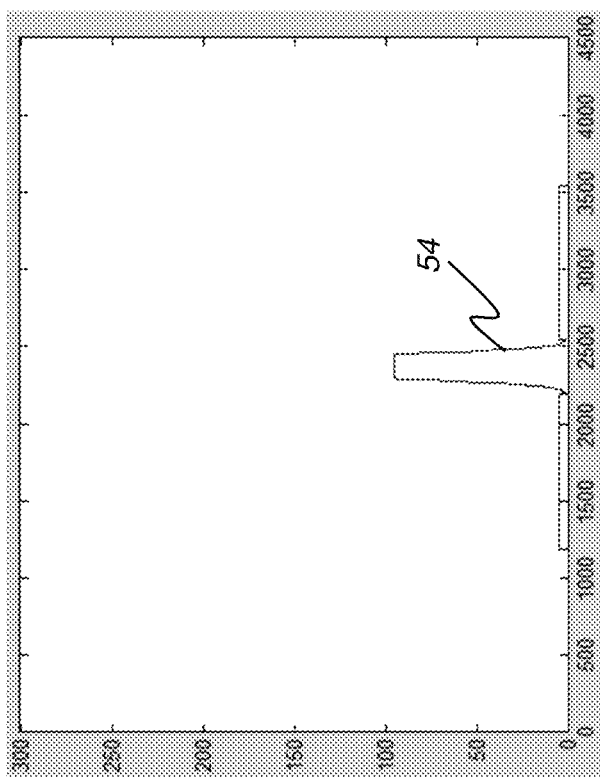
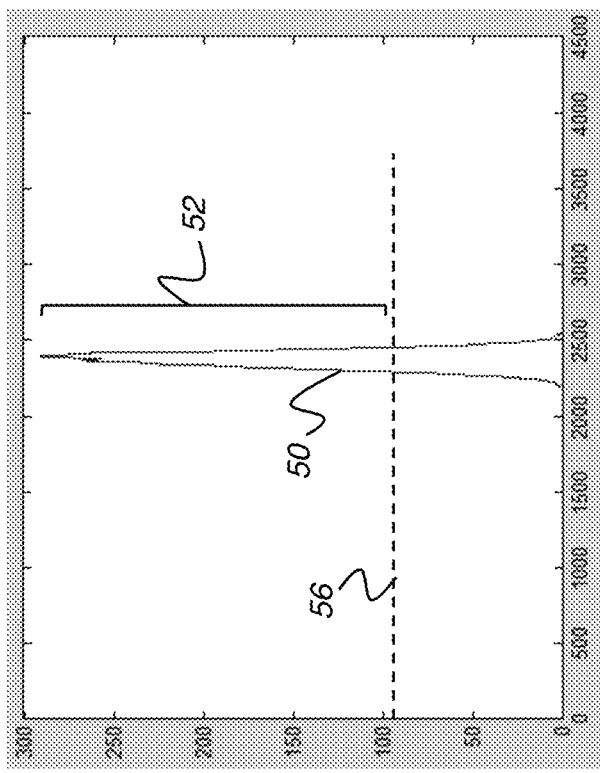
FIG. 5A
FIG. 5B

| Original image: std: 164, mean: 2393 | Original image contrast: 0.068 |
| --- | --- |
| Level I enhancement: std: 224, mean: 2379 | Level I contrast: 0.094, 38% increase |
| Level II enhancement: std: 305, mean: 2338 | Level II contrast: 0.133, 95% increase |
| Level III enhancement: std: 376, mean: 2301 | Level III contrast: 0.163, 139% increase |
| Level IV enhancement: std: 437, mean: 2270 | Level IV contrast: 0.192, 182% increase |

FIG. 13A

METHOD FOR ENHANCING RECONSTRUCTED 3-D TOMOSYNTHESIS VOLUME IMAGE

CROSS REFERENCE TO RELATED APPLICATIONS

This application claims the benefit of U.S. Provisional Patent Application Ser. No. 61/616,065 filed Mar. 27, 2012 in the names of Zhiqiang Lao et al., the contents of which are incorporated fully herein by reference. This application also claims the benefit of U.S. Provisional Patent Application Ser. No. 61/791,439 filed Mar. 15, 2013 in the names of Zhiqiang Lao et al., the contents of which are incorporated fully herein by reference.

FIELD OF THE INVENTION

Embodiments of the present invention relate to contrast enhancement for 3-D volume imaging and more particularly relate to methods for local and global contrast enhancement for volume image slices obtained using linear tomosynthesis.

BACKGROUND

Tomosynthesis obtains volume image data by directing x-ray radiation through a patient from a range of angles. At each angle, corresponding 2-dimensional (2-D) projection image data is acquired. Volume reconstruction techniques then generate 3-dimensional (3-D) image voxel data using information from the set of projection image data.

For some types of volume image content, there can be a very wide range of bone and tissue densities, requiring a correspondingly wide contrast range. Even though a wide range is needed, contrast for tomosynthesis image slices can be disappointing. For chest images, for example, it can be difficult to distinguish features such as lung tissue textures without applying some type of image enhancement. Volume image content, displayed as image slices, often lacks sufficient contrast needed for accurate analysis and may not provide diagnostically useful information.

Because of the relatively anisotropic resolution that is provided by tomosynthesis imaging, image enhancement techniques that have been used with other types of radiographic imaging can fall short of what is needed for contrast improvement. Among problems encountered with conventional image processing approaches are conflicting requirements for localized contrast within a small region of interest within an image slice and global contrast across the image slice. Thus, it can be appreciated that there is a need for image processing solutions that improve local contrast without compromising overall contrast for the complete image slice.

SUMMARY

Embodiments of the present invention address the need for local contrast enhancement for 3-D tomosynthesis image data. 3-D volume image enhancement approaches of the present invention provide improved visualization for local regions of the image slice as well as improvement of the overall image contrast for the full image slice. A measure of operator control of contrast enhancement variables is provided, allowing interactive parameter adjustment, so that contrast can be improved appropriately for improved presentation of tissue within one or more regions of interest (ROIs).

According to an embodiment of the present invention, there is provided a method for providing tomosynthesis 3-D volume image data, executed at least in part on a computer, comprising:

a) acquiring a plurality of radiographic projection images of a subject over a range of angles;

b) generating reconstructed volume image data from the acquired projection images;

c) defining a plurality of regions of interest within the reconstructed volume image data, wherein each region of interest has a plurality of image voxels;

d) conditioning image voxel data values within at least one of the regions of interest to enhance contrast within the at least one region of interest;

e) adjusting the conditioned image voxel data values within the at least one of the regions of interest according to interpolation with two or more neighboring regions of interest; and f) displaying an image slice having at least a plurality of the adjusted image voxel data values.

These objects are given only by way of illustrative example, and such objects may be exemplary of one or more embodiments of the invention. Other desirable objectives and advantages inherently achieved by the may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIG. 5A is a graph of a histogram showing parameters that can be adjusted for histogram equalization.

FIG. 5B is a graph showing a histogram after histogram equalization.

FIG. 13A shows a table of results for 3-D tomosynthesis image enhancement at different levels.

DESCRIPTION OF EXEMPLARY EMBODIMENTS

Figure 1A:
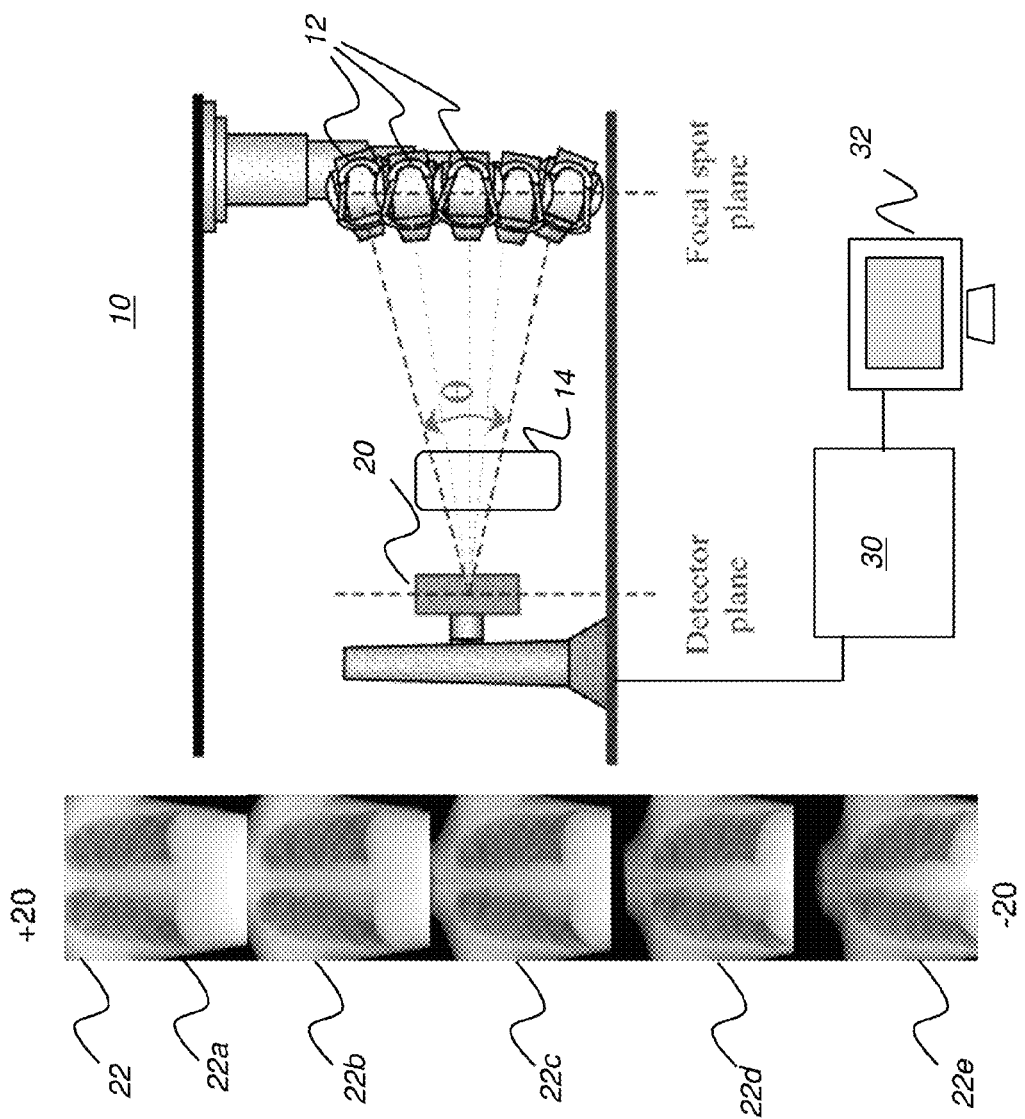
FIG. 1A is a schematic block diagram of a tomosynthesis imaging apparatus according to an embodiment of the present invention.

The following is a detailed description of exemplary embodiments, reference being made to the drawings in which the same reference numerals identify the same elements of structure in each of the several figures.

Where they are used in the context of the present disclosure, the terms "first", "second", and so on, do not necessarily denote any ordinal, sequential, or priority relation, but are simply used to more clearly distinguish one step, element, or set of elements from another, unless specified otherwise.

Certain exemplary embodiments described herein include, but are not limited to image enhancement for 3-D volume image data obtained using tomosynthesis radiography. Both local and global contrast enhancement can be provided.

The schematic diagram of FIG. 1A shows components and behavior of a tomosynthesis imaging apparatus 10 according to an embodiment of the present invention. In a sequence of exposures, an x-ray source 12 directs radiation through a subject 14 from a set of different angles θ. At each exposure, a detector 20 acquires image data for a projection image 22. By way of example, FIG. 1A shows five projection images 22a, 22b, 22c, 22d, and 22e, one for each angular position of x-ray source 12, over an angular range from −20 degrees to +20 degrees. For convenient reference, projection images 22a, 22b, 22c, 22d, and 22e are collectively termed projection image 22. It should be observed that any number of projection images 22 can be obtained for obtaining volume image data, each at a different angle θ. A computer 30 obtains the projection image data from detector 20, processes the projection image data to generate reconstructed 3-D volume image data, and provides a display 32 for viewing the reconstructed 3-D image data. Display 32 also provides an operator interface for entry of parameters that affect the image data enhancement provided, according to an embodiment of the present invention.

Figure 1B:
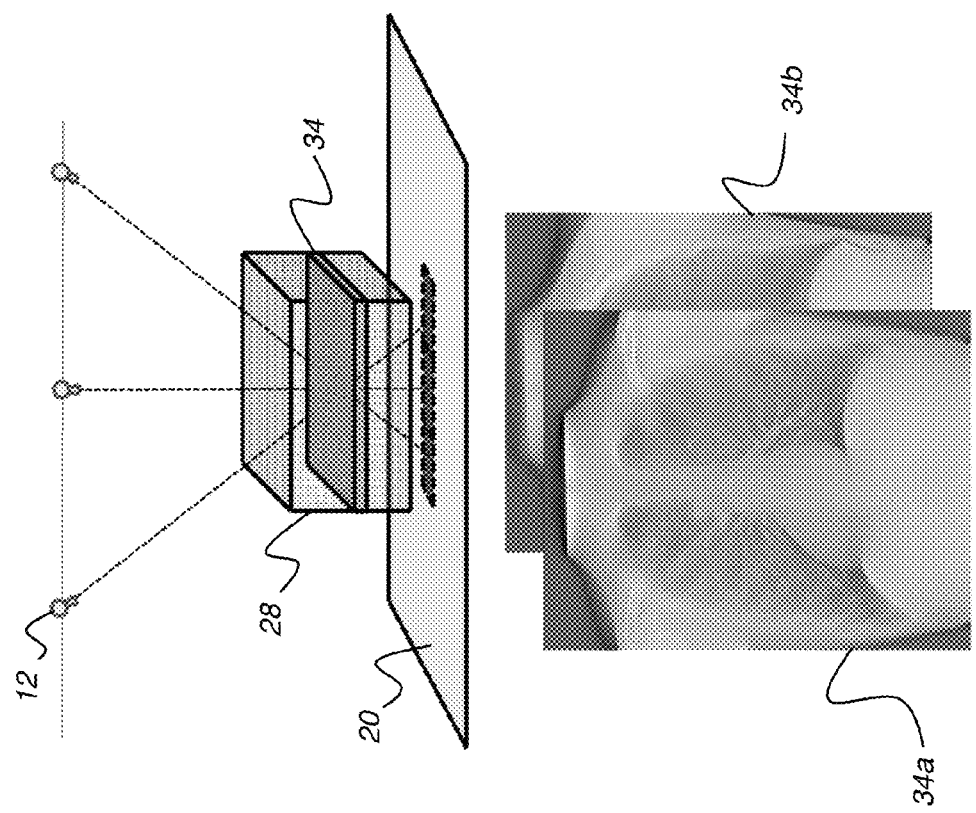
FIG. 1B schematically shows volume image data as obtained from imaging at a number of angles to provide a reconstructed volume.
Figure 2:
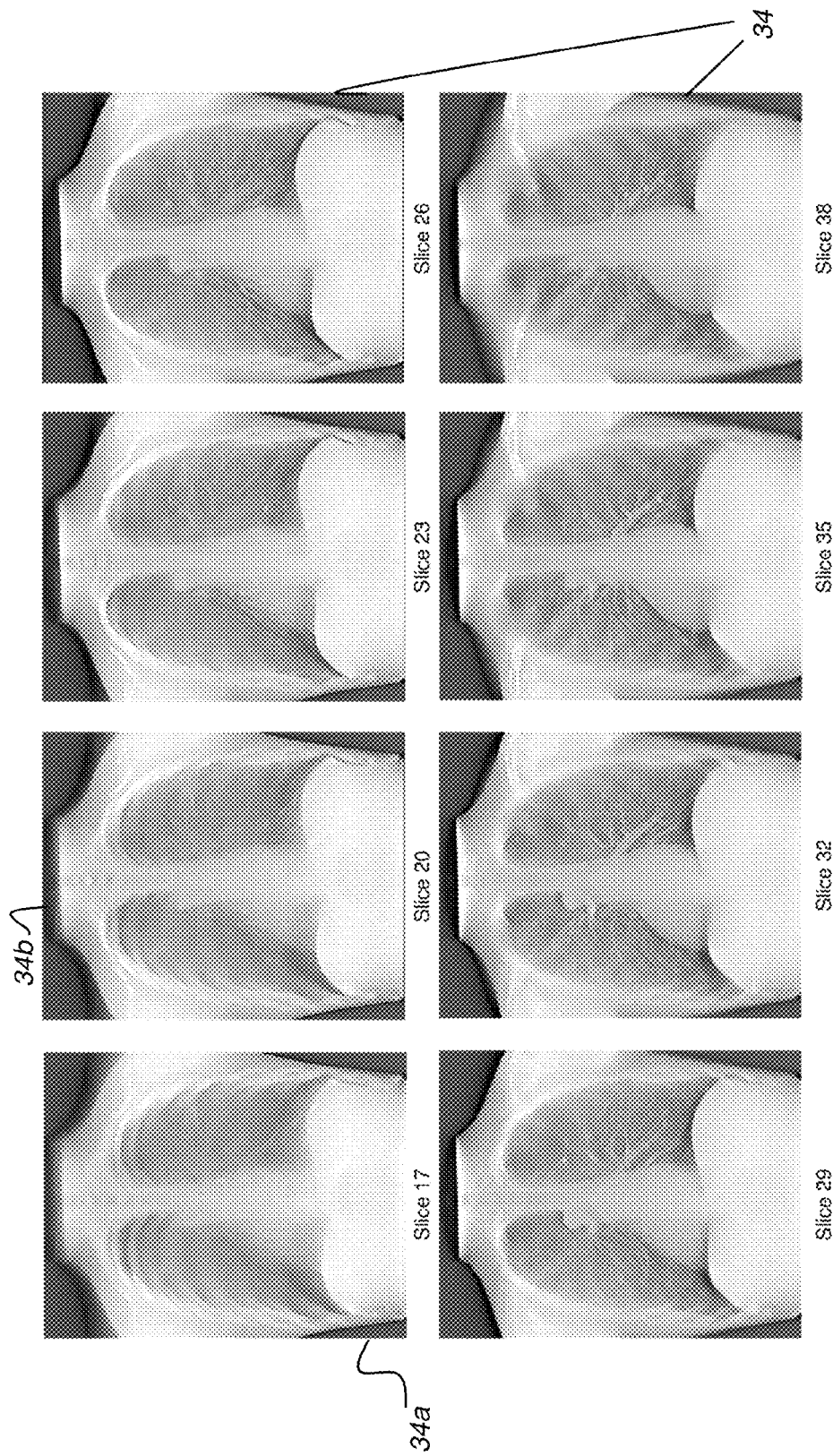
FIG. 2 shows a number of image slices obtained from exemplary volume image data.

The schematic diagram of FIG. 1B shows volume image data 28 as obtained from imaging at a number of angles. A representative image slice 34 within the data is shown, along with image slices 34a and 34b, reconstructed from the projection images 22. By way of example, FIG. 2 shows a number of image slices 34 obtained from volume image data.

Figure 3:
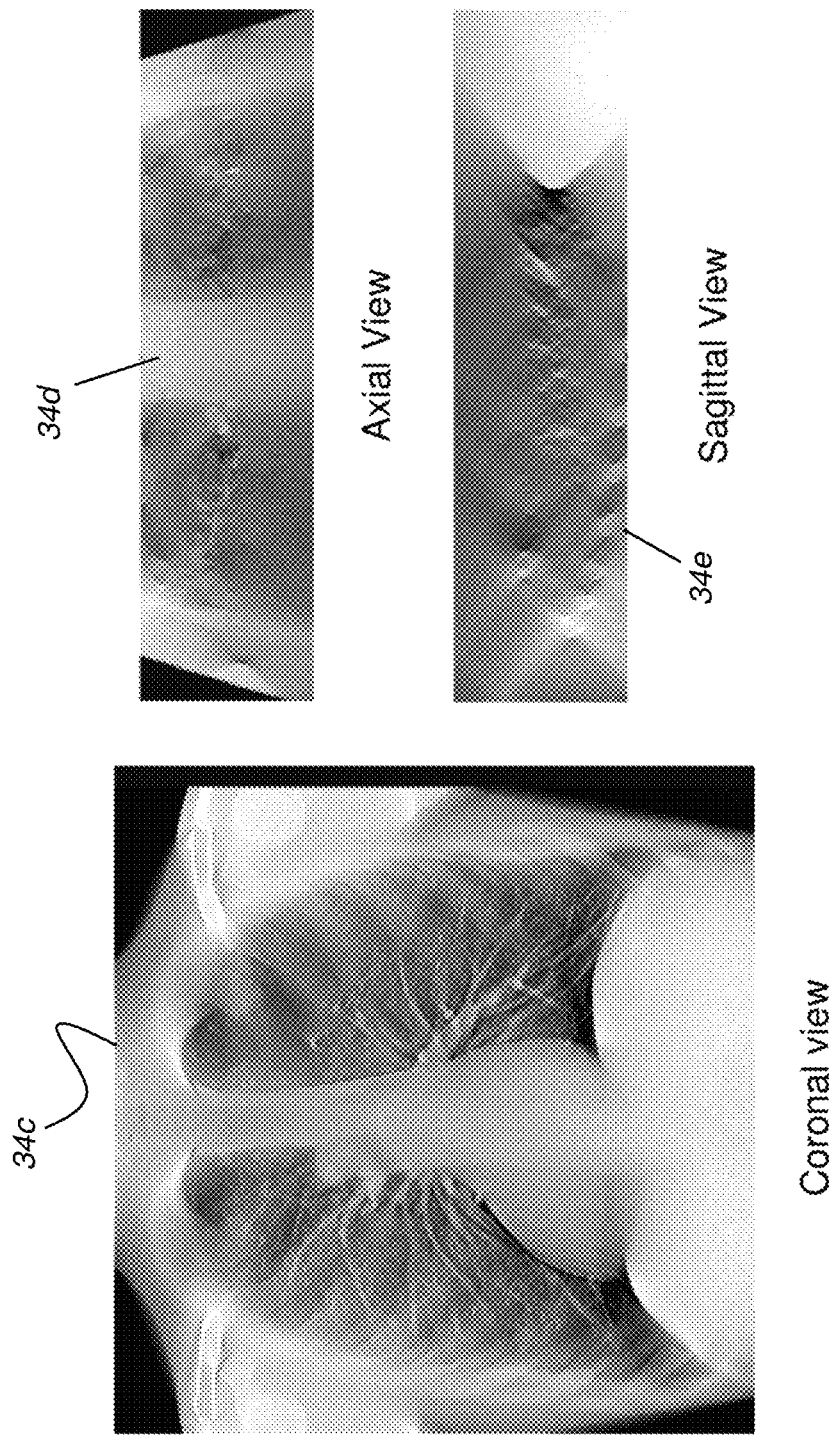
FIG. 3 shows exemplary coronal, axial, and sagittal slices obtained from tomosynthesis volume image data.

One particular difficulty in generating volume image data from a limited range of imaging angles relates to the inherently anisotropic resolution of the imaging process. As shown in the examples of FIG. 3, a coronal slice 34c has generally good resolution. However, an axial slice 34d and a sagittal slice 34e show that resolution is poor with respect to orthogonal axes of the 3-D space.

Figure 4A:
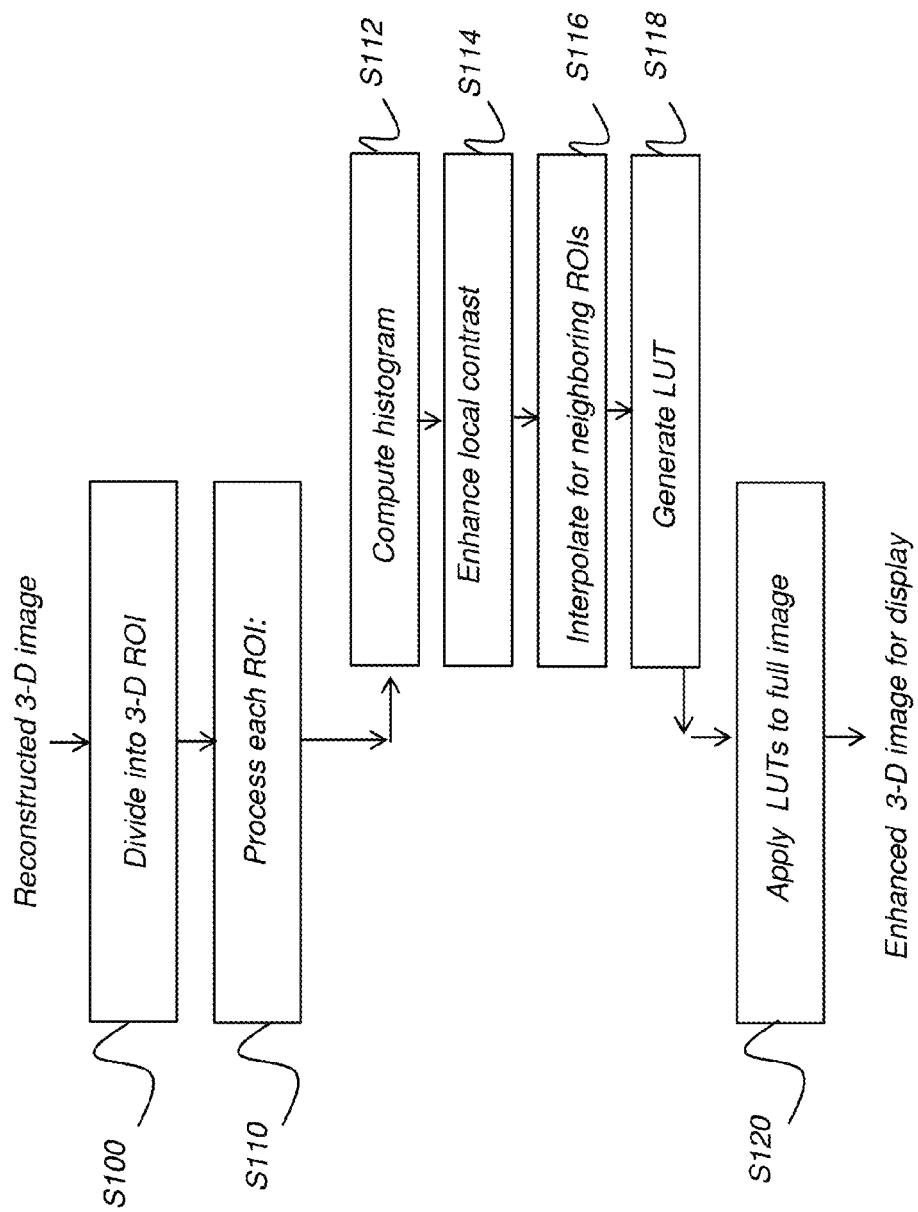
FIG. 4A is a logic flow diagram that shows processing steps for obtaining a contrast-enhanced 3-D image from a reconstructed 3-D image obtained using tomosynthesis.

In processing the volume image data according to an embodiment of the present invention, the image content is divided into one or more regions of interest (ROI). Individual ROIs are processed and their results combined in order to provide the enhanced 3-D image content. The logic flow diagram of FIG. 4A shows processing steps for obtaining a contrast-enhanced 3-D image from a reconstructed 3-D image obtained using tomosynthesis. Volume image data is initially obtained by generating reconstructed volume image data from a set of acquired projection images. Volume image reconstruction techniques are well known, familiar to those skilled in the tomosynthesis imaging arts, and include various types of back-projection algorithms, for example.

Figure 4B:
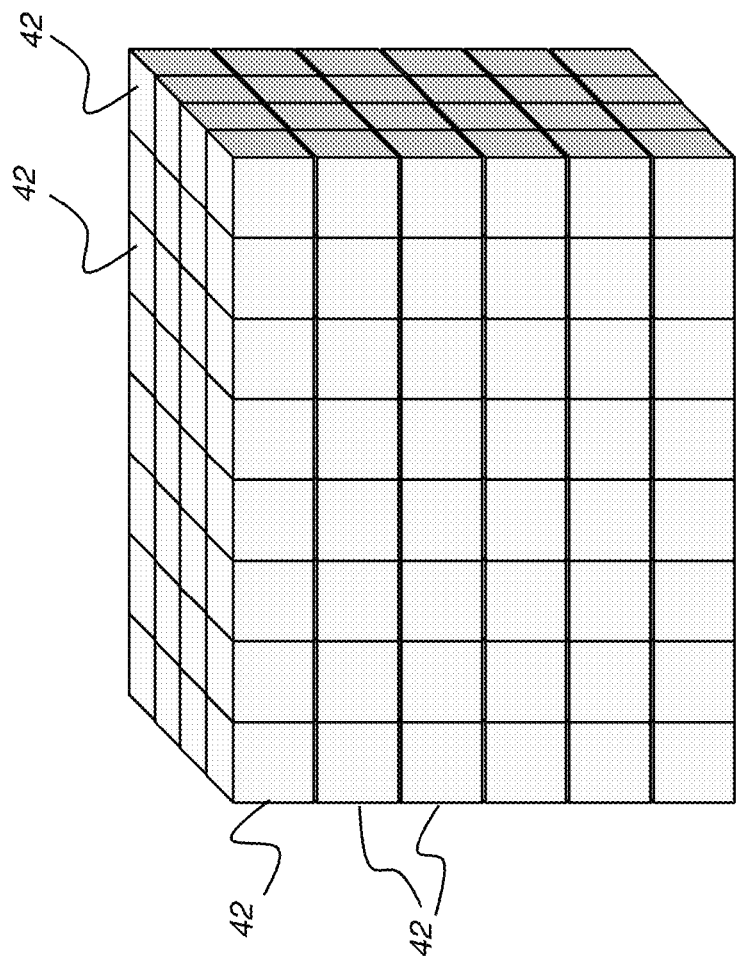
FIG. 4B shows a volume image that has been divided into a number of ROIs.
Figure 4C:
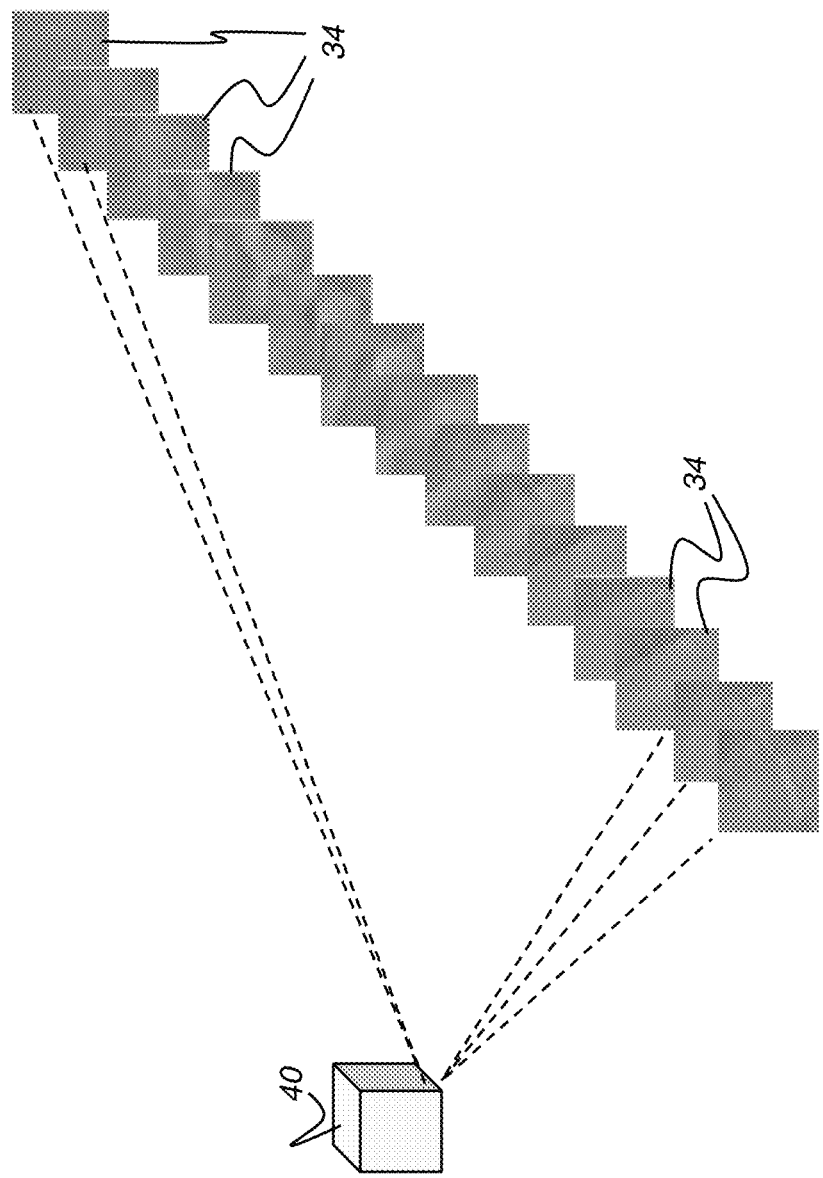
FIG. 4C is a schematic diagram that shows multiple image slices obtained from reconstructed volume image data.

Following FIG. 4A, in an ROI division step S100, the volume image is divided into a number of ROIs. The block diagram of FIG. 4B shows a volume image 40 that has been divided into a number n of ROIs 42, considered to be independent from each other for initial processing. The number n is an integer, 1 or larger. A processing step S110 is then executed on each ROI. Sub-processes in processing step S110 include a histogram computation step S112, a local contrast enhancement step S114, an interpolation step S116, and a look-up table (LUT) generation step S118. Each ROI can further have additional values, such as a uniformity index that indicates the relative texture or other characteristics of the volume content in that region, for example. The uniformity index or other characteristic value for image content can be used to determine how ROI 42 is processed for improved contrast. After each ROI is processed, an LUT application step S120 applies the generated LUTs to the full 3-D image. The LUTs are modified based on their spatial correlation to provide this global contrast adjustment. The operator may also be able to select a desired level of detail for global contrast adjustment; this selection controls at least some percentage of the contrast increase that is provided. The resulting enhanced 3-D image can then be displayed, typically in the form of image slices 34, as described previously with reference to FIGS. 1B and 2 and as represented schematically for volume 40 in FIG. 4C.

ROIs 42 are shown as cubic in shape in FIG. 4B and of the same size, evenly distributed in rows and columns. However, it should be noted that ROIs can have any suitable shape, including cubic square, cubic rectangle, sphere, ellipsoid, or cylinder, for example. ROIs 42 can be overlapping or non-overlapping and need not be arranged in symmetric rows and columns. Some "padding" or addition of ROIs may be used to increase the number of ROIs for more straightforward computation. According to an embodiment of the present invention, the size of ROI 42, that is, its width/height/depth dimensions in terms of voxels, is operator-specified. ROI dimensions and shape can also vary according to the type of tissue that is contained within a region.

Figure 4D:
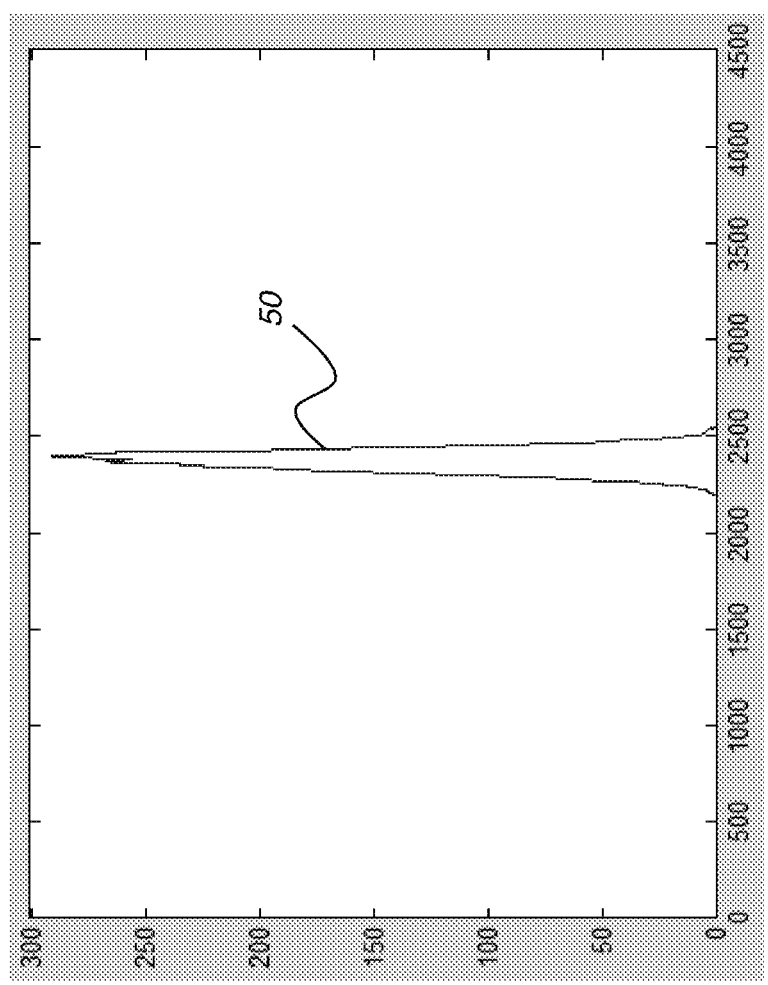
FIG. 4D is a graph showing a histogram for a region of interest.

The graph of FIG. 4D shows an example of a histogram 50 for an ROI. In the data value distribution that is shown, image data for voxels within the ROI are clustered within a small range of values, between about 2200 and 2500. With such tight clustering of values, image contrast is generally poor. Conditioning the data by broadening the range of image data values, using methods such as constrained or contrast-limited histogram equalization (HE), tends to improve image contrast. For the particular example of FIG. 4D, the following values have been calculated: for a rough variation estimation, standard deviation $\sigma$ is approximately 53.59; contrast, computed as the quotient $\sigma/\mu$ where $\mu$ represents the mean, is approximately 0.226.

The graphs of FIG. 5A and FIG. 5B show how histogram 50 values can be redistributed, thereby conditioning the image data for improved contrast within each ROI. In effect, the number of values in a redistributed portion 52, exceeding a selected cutting point 56, are redistributed to obtain a second histogram 54 that extends over a broader range of values. The selection of an appropriate cutting point 56 determines how many voxels have the predominant values and how much spread is provided to the original histogram. This provides a re-mapping of at least a portion of the obtained volume data values to an expanded range of data values. The re-mapping can be either a linear or a non-linear re-mapping, including a non-linear monotonic re-mapping.

When the histogram-based adjustment described with reference to FIGS. 5A and 5B executes, however, only local contrast conditioning within each ROI 42 is achieved. For the complete image slice, this localized conditioning can cause unwanted "tiling" effects such as those shown for an original image 60 slice in FIG. 6A by the corresponding ROI arrangement in an adjusted image slice 62 of FIG. 6B. ROI 42 boundaries are clearly visible, so that some additional adjustment to the local contrast improvement is needed.

Figure 6B:
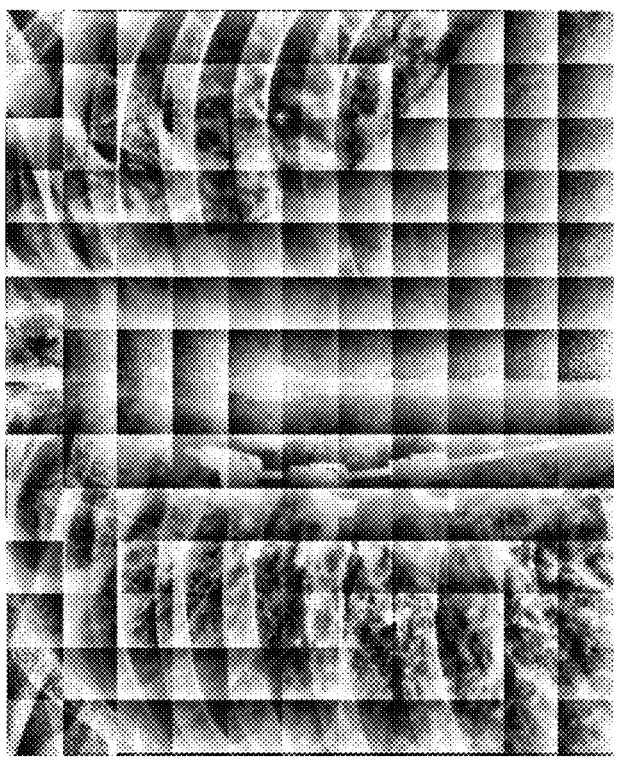
FIG. 6B is a plan view of the image slice of FIG. 6A following local enhancement.
Figure 6A:
FIG. 6A is a plan view of an image slice prior to enhancement.
Figure 7:
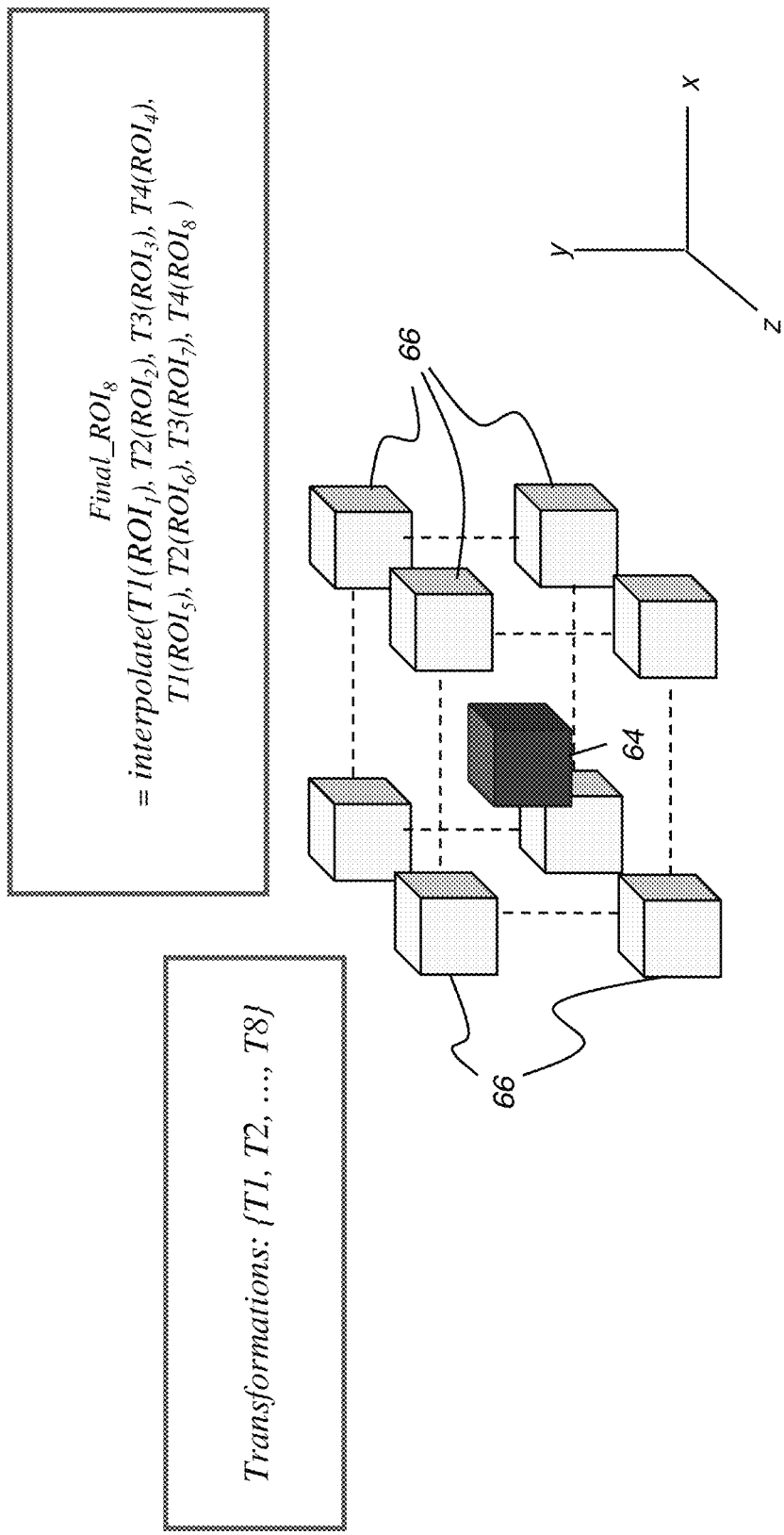
FIG. 7 is a schematic diagram that shows spatial relationships for ROI interpolation.

According to certain exemplary embodiments, an interpolation transformation is needed to overcome the problem shown for image slice 62 in FIG. 6B. Unlike interpolation for 2-D images, the interpolation needed for image voxels with reconstructed tomosynthesis image content encounters the problem of anisotropic resolution for coronal, axial, and sagittal planes described previously with respect to FIG. 3. The schematic view of FIG. 7 shows interpolation transformations for a given ROI 64 with an arrangement of neighboring ROIs 66. Eight neighboring ROIs 66 are shown in FIG. 7, with exaggerated spacing for better visibility, and described with respect to eight transformations T1, T2, . . . T8 for eight corresponding ROIs 66, listed as $ROI_1$-$ROI_8$ in FIG. 7. However, it must be emphasized that any number m of transformations T1, T2, . . . Tm for m corresponding neighboring ROIs 66 can be performed for successful interpolation that provides contrast improvement. Using the cubic ROI of FIG. 4B, for example, each ROI actually has 26 "contingent" or "touching" neighbors—9 in the plane ahead, 9 in the plane behind, 8 in the same plane. In addition, the spatial arrangement of neighboring ROIs can also be varied for interpolation. The interpolation transform for each neighboring ROI 66 takes into account both the data value of the neighboring ROI 66 and its relative distance from the given ROI 64, including its relative direction. The anisotropy of resolution is also a factor in interpolation, with corresponding weighting applied according to the direction of each neighboring ROI. A number of interpolation transforms can be applied, including both linear and non-linear transforms. Various interpolation transforms and algorithms are known in the art, including histogram stretching, histogram projection that assigns equal display space to each data point, normalization and matching algorithms that apply different transforms depending on different value distributions. Transforms can be applied in any number of forms, such as using LUTs or matrices, for example. Randomization of values in neighboring ROIs can alternately be performed. The transformation that is applied can be varied according to the type of examination.

Because of the anisotropic relationship of voxel values, transforms T1, T2, . . . Tm are selectively weighted with relation to ROI distances and corresponding directions along respective orthogonal axes x, y, and z. Neighboring ROIs 66 can include both ROIs lying within any of the same coronal (x-y), axial (x-z), or sagittal (y-z) planes of ROI 64 and ROIs lying outside these planes.

Figure 8B:
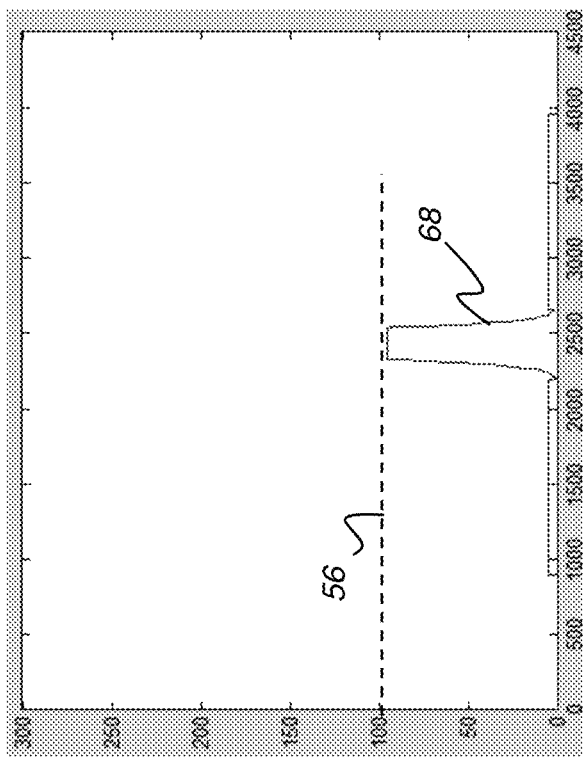
FIG. 8B shows a histogram of image data following cutting, redistribution and transformation (equalization) based on the histogram of the original data.
Figure 8A:
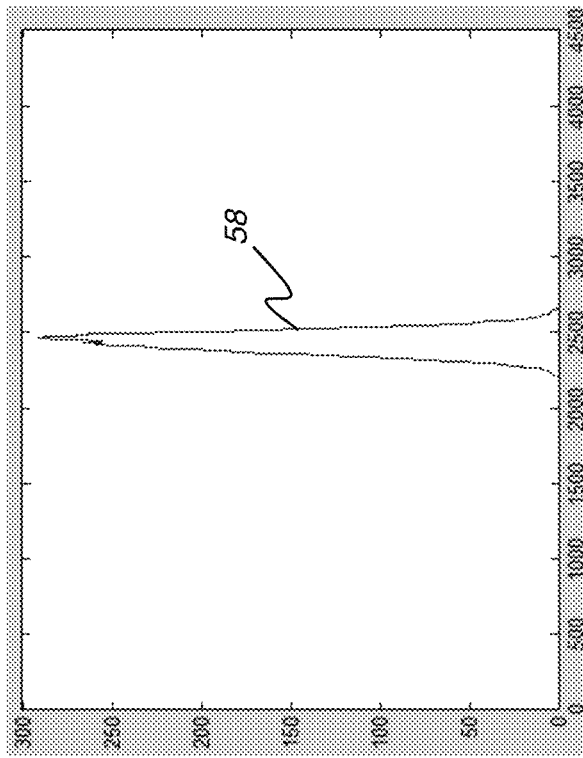
FIG. 8A shows a histogram of image data following cutting and transformation (equalization) based on the histogram of the original data.

FIG. 8A shows a histogram 58 of image data following cutting and transformation (equalization) based on the histogram of the original data. FIG. 8B shows a histogram 68 of image data following cutting, redistribution and transformation (equalization) based on the histogram of the original data. Interpolation transforms T1, T2, . . . Tm, step S116 in FIG. 4A, can alternately be performed prior to the local contrast enhancement of step S114. FIG. 5C shows an interpolation transform performed on ROI 64, altering the histogram originally shown in FIG. 4D. FIG. 5D shows application of cutting point 56 for histogram equalization following the interpolation transform.

Figure 9C:
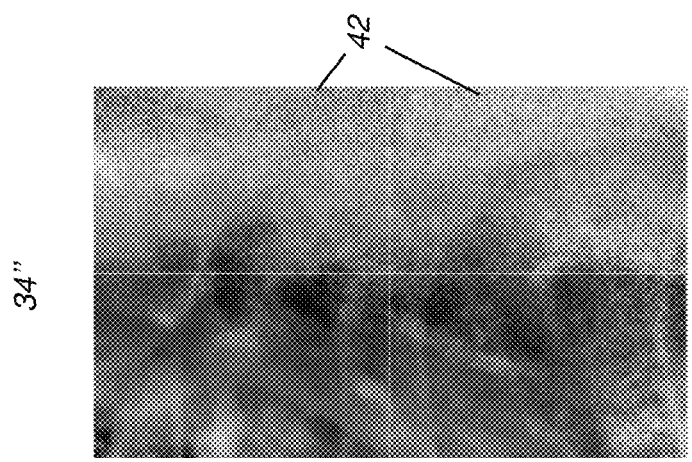
FIG. 9C shows an image slice with the same ROIs in FIG. 9A after both local contrast enhancement and interpolation.
Figure 9B:
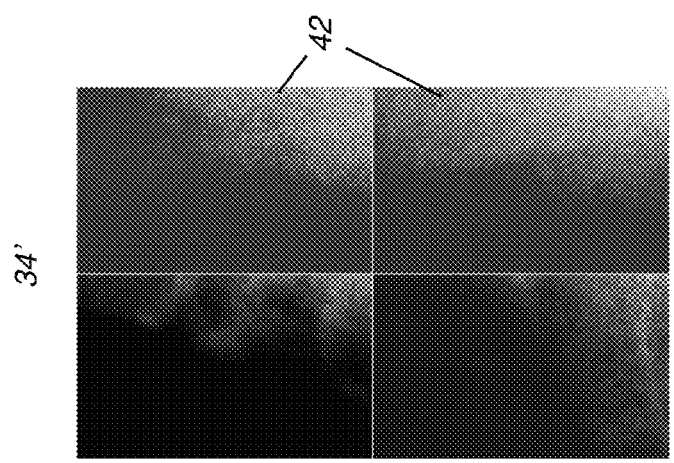
FIG. 9B shows an image slice with the same ROIs in FIG. 9A following local contrast enhancement.
Figure 9A:
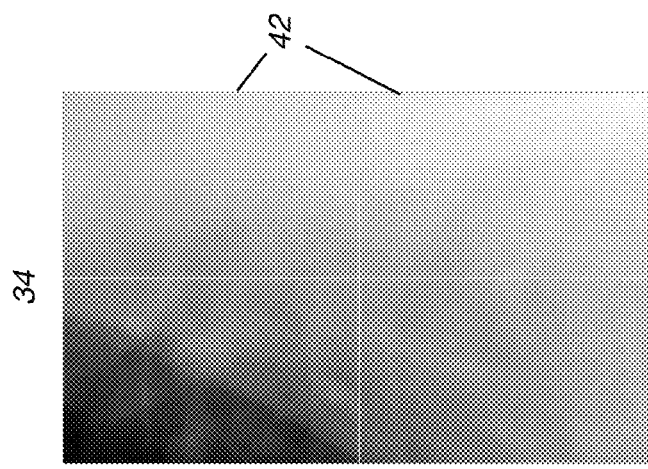
FIG. 9A shows an original image slice with four ROIs identified.
Figure 10C:
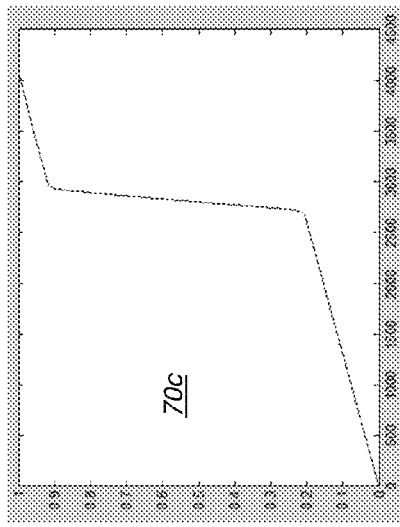
FIGS. 10A, 10B, 10C, and 10D are LUTs for obtaining the image of FIG. 9B.
Figure 10D:
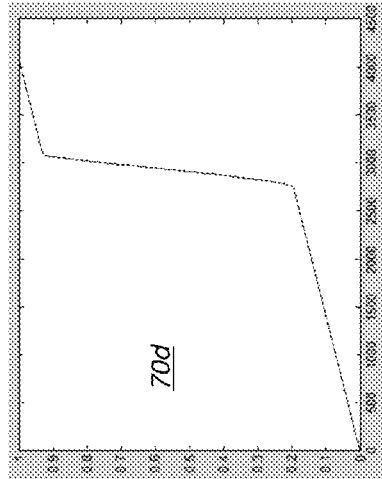
Figure 10A:
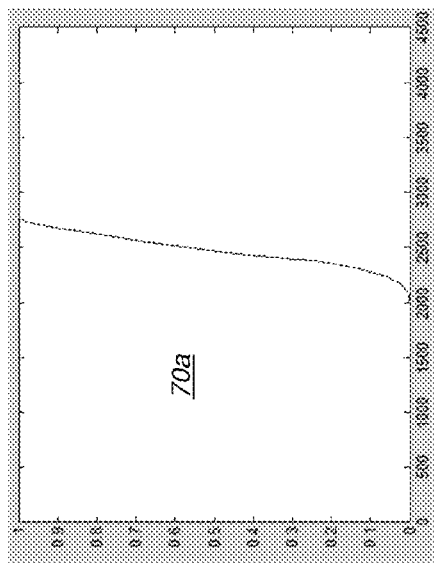
Figure 10B:
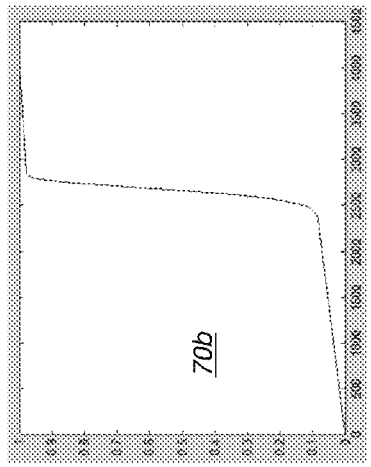
Figure 11C:
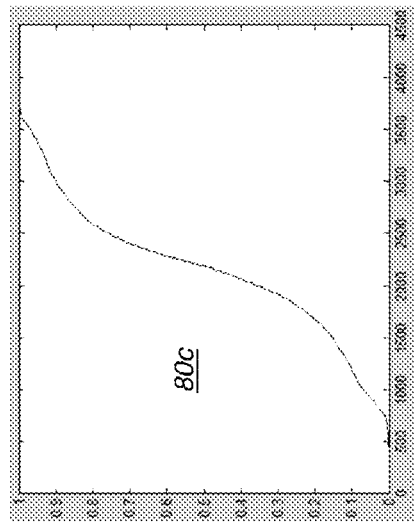
FIGS. 11A, 11B, 11C, and 11D are LUTs for obtaining the image of FIG. 9C.
Figure 11D:
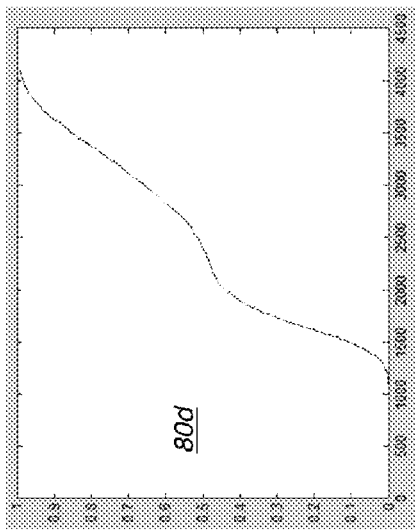
Figure 11A:
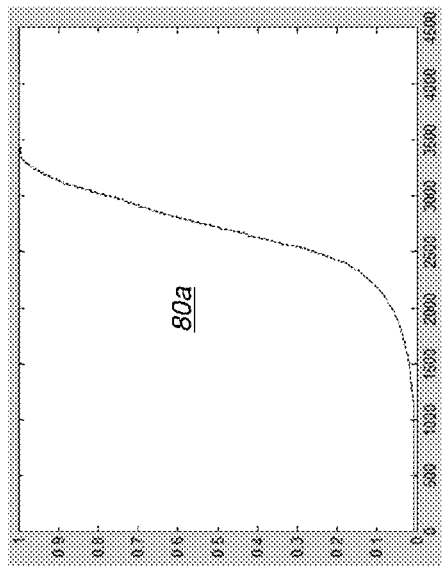
Figure 11B:
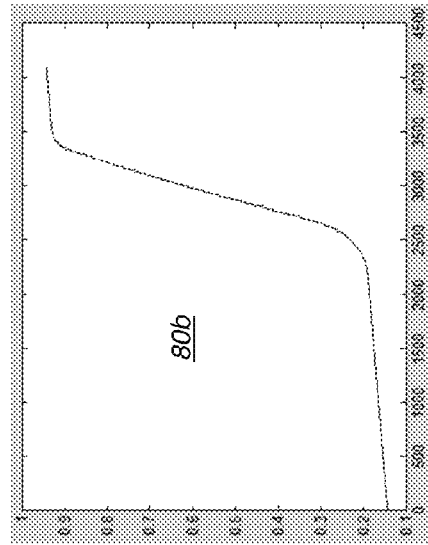

By way of example, FIG. 9A shows an original image slice 34 with four ROIs 42 identified. FIG. 9B shows an image slice 34' with the same ROIs 42 following local contrast enhancement. FIG. 9C shows an image slice 34" with the same ROIs 42 after both local contrast enhancement and interpolation.

Look-up tables (LUTs) are generated in LUT generation step S118 (FIG. 4A) and are used in processing, applied to the image content in step S120. FIGS. 10A, 10B, 10C, and 10D show LUTs 70a, 70b, 70c, and 70d for the local contrast enhanced ROIs of FIG. 9B. FIGS. 11A, 11B, 11C, and 11D show adjusted LUTs 80a, 80b, 80c, and 80d for the corresponding ROIs 42 of FIG. 9C. These LUTs may not be stored, but can be dynamically generated for each ROI based on interpolation. The final voxel mapping is a function of the pixel value and its relative spatial location, as well as neighboring voxel values. Interpolation with values in neighboring ROIs is weighted according to distance.

Figure 12B:
FIG. 12B shows the corresponding results for the same image as in FIG. 12A when additional interpolation transforms are applied.
Figure 12A:
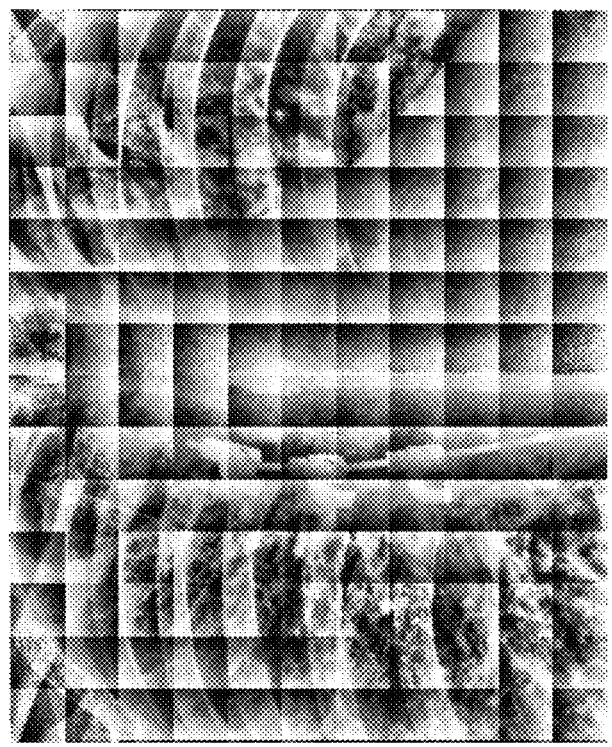
FIG. 12A shows the results of local contrast enhancement for an example tomosynthesis chest x-ray image slice.

FIG. 12A shows the results of local contrast enhancement for an example tomosynthesis chest x-ray image slice 62, as shown earlier in FIG. 6B. FIG. 12B shows the corresponding results for the same image, as image slice 64, when additional interpolation transforms are applied.

Figure 13C:
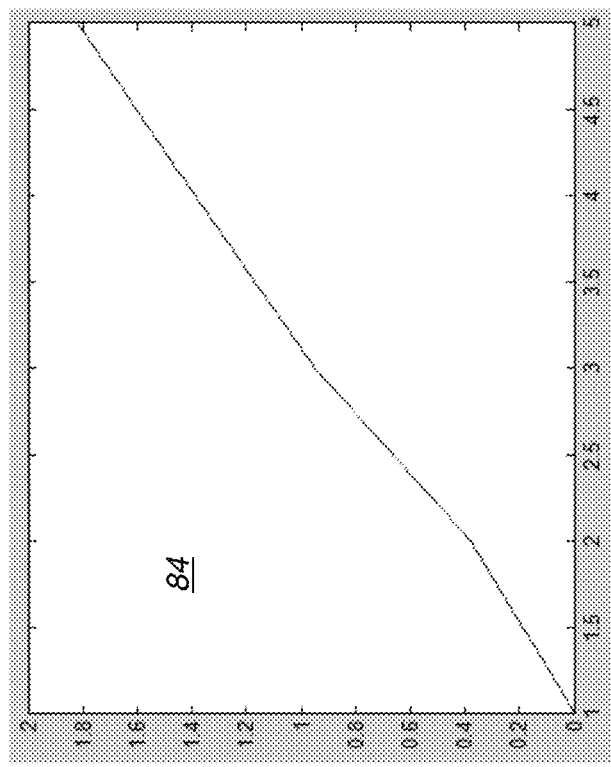
FIG. 13C is a graph that shows contrast improvement for different levels of contrast enhancement according to an embodiment of the present invention.
Figure 13B:
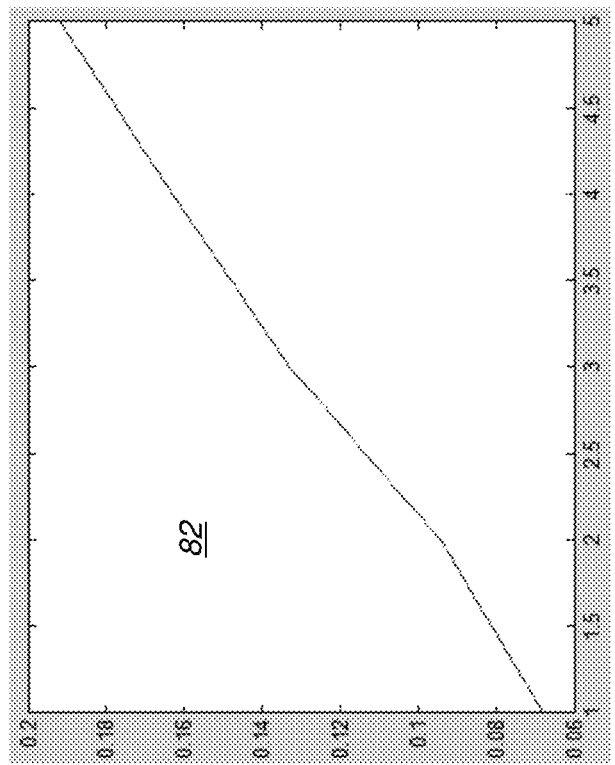
FIG. 13B is a graph that shows contrast values for different levels of contrast enhancement according to an embodiment of the present invention.

FIG. 13A shows a table of results for 3-D tomosynthesis image enhancement at different levels, shown as Levels I, II, III, and IV. The different levels correspond to different cutting point 56 settings for the local contrast enhancement step S114 in FIG. 4A. Standard deviation (std) and mean values are shown at each level. For comparison, improvements in contrast are shown for each level. Graphs of FIGS. 13B and 13C show contrast values 82 and contrast improvement 84, respectively, for different levels of enhancement.

Figure 14C:
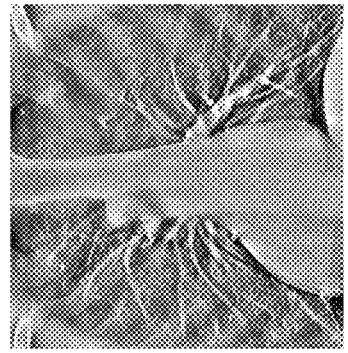
FIGS. 14B, 14C, 14D, and 14E show image slices for enhanced image content at different levels.
Figure 14B:
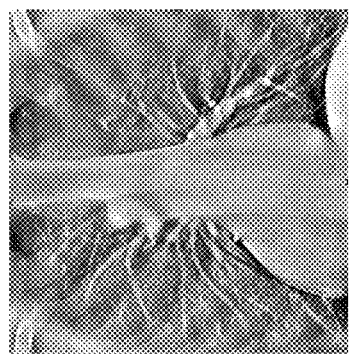
Figure 14A:
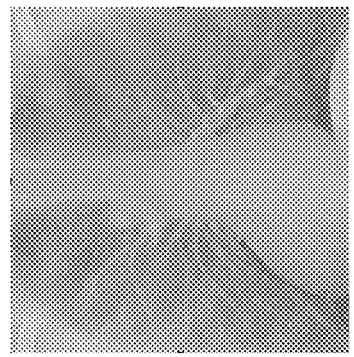
FIG. 14A shows an original image slice.
Figure 14E:
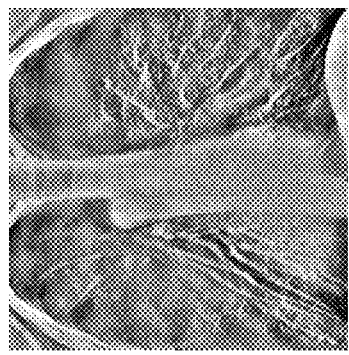
Figure 14D:

FIG. 14A shows an original image slice 34. FIGS. 14B, 14C, 14D, and 14E show image slices 34" for enhanced image content at different levels.

Figure 15:
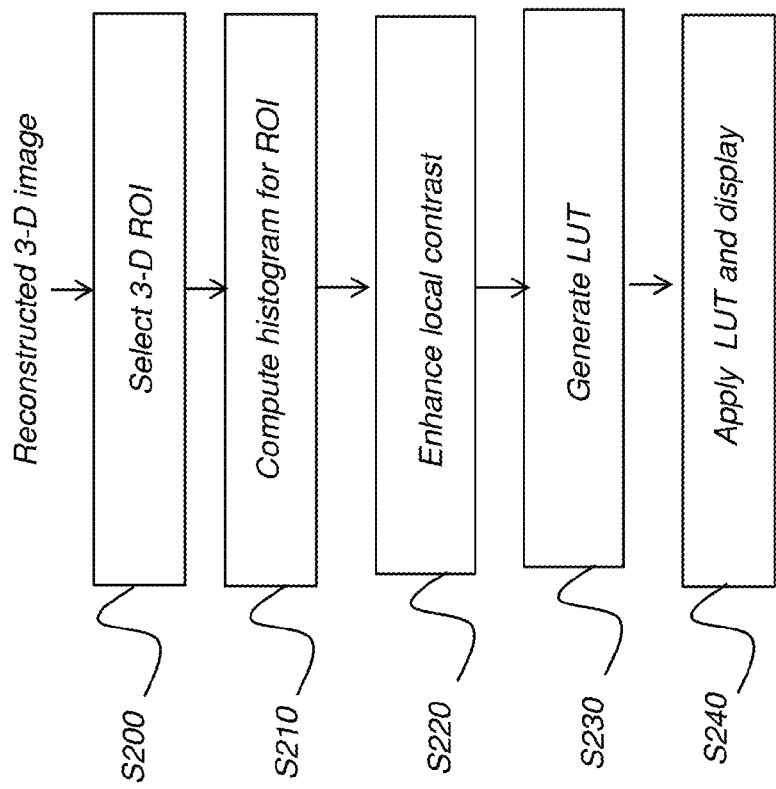
FIG. 15 is a logic flow diagram that shows steps for applying contrast enhancement to a single ROI.
Figure 16:
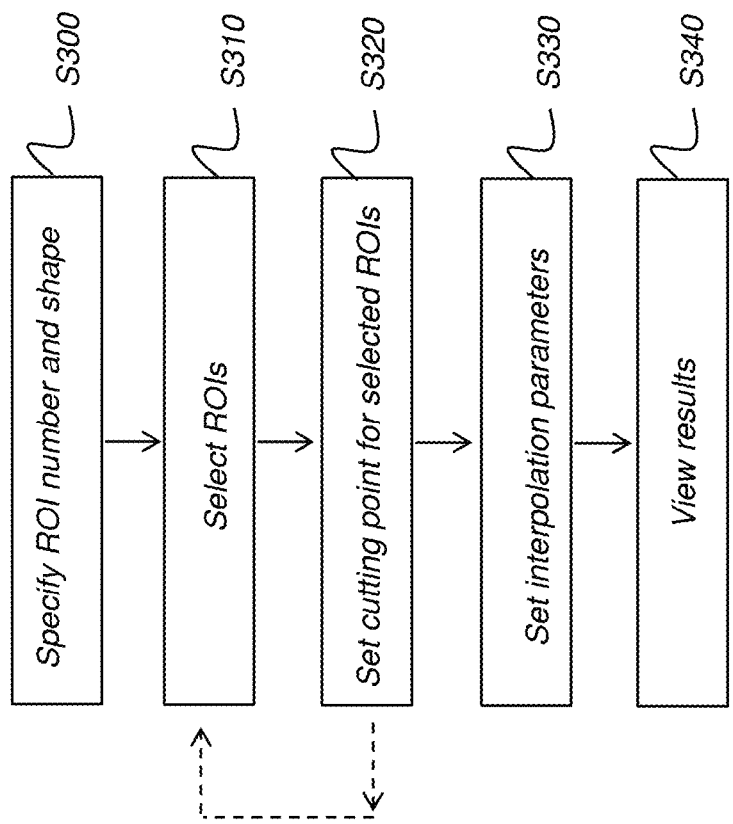
FIG. 16 is a logic flow diagram that shows operator steps for entering parameters for contrast enhancement.

Embodiments of the present invention can be applied for a single ROI of a larger image using steps shown in the logic flow diagram of FIG. 15. The ROI is defined in an ROI selection step S200. A histogram for the ROI is computed in a histogram computation step S210. Local contrast is enhanced using histogram equalization or other method in a local contrast enhancement step S220. An LUT is generated in an LUT generation step S230. The LUT is applied and results displayed in an LUT application step S240.

Embodiments of the present invention provide an operator, such as a technician or practitioner, with a number of utilities for determining how image enhancement is executed, such as for setting the enhancement level. The logic flow diagram of FIG. 15 shows a sequence of operator steps that can be performed using the operator interface to computer 30 at display 32 (FIG. 1A). Operator instructions can be entered using any of a number of standard operator interface tools, including slide bars, dials, numeric entry, check boxes, menu pull-downs, and other techniques for providing parameter values. An ROI definition step S300 enables the operator to define the number of ROIs for a reconstructed tomosynthesis image and to specify their relative shape and other features, including whether or not a measure of overlap is provided between ROIs. In an ROI selection step S310, the operator specifies one or more ROIs 42 that are to be adjusted. This may be an ROI that is characteristic of particular tissue of interest or may be the ROIs within a particular portion of the imaged volume, such as all of the lung tissue for a chest tomosynthesis image, for example. In a cutting point specification step S320, the operator specifies the cutting point 56 for the histogram of the selected ROI or ROIs; this is considered to be a level adjustment as the term is used herein. As shown in FIG. 15, additional ROIs can be selected and adjusted separately as needed. An interpolation parameters setup step S330 defines a number of interpolation parameters, such as type of interpolation algorithm used, arrangement of neighboring ROIs 66 (FIG. 7) that are used for interpolation, positions of neighboring ROIs used and weighting assignments, level of enhancement desired, and other variables. The operator can enter instructions relating to interpolation parameters for each ROI or for types of ROI. Following processing based on operator entries, results are then displayed in a results viewing step S340. According to an embodiment of the present invention, an operator has access to utilities for varying both local ROI enhancement and interpolation transformation parameters while viewing one or more image slices from the volume image data. Near real-time image processing, available using graphical processing unit (GPU) accelerators, allows the operator to quickly view results and adjust contrast parameters for both local and global enhancement.

As noted previously, ROIs can be non-overlapping or overlapping. In the case of overlapping ROIs, additional processing is provided to compensate for differences in computed values for voxels that belong to more than one ROI.

It should be noted that histogram equalization is one method for contrast enhancement that can be used within an ROI. Other methods include various types of gradient analysis and adjustment, for example. A clipping value can alternately be applied for control of contrast enhancement.

From another aspect, the present invention provides a method for processing a tomosynthesis reconstruction 3-D volume, executed at least in part on a computer. First volume data is received for the reconstructed 3-D tomosynthesis volume, wherein the volume data values extend within a first range. This first volume data may be processed data, pre-processed data, or raw data. The method generates conditioned volume data by re-mapping at least a portion of the first volume data values to a second range that is expanded over the first range of the first volume data. This can be the same type of remapping shown for a histogram in the example of FIGS. 5A and 5B. The remapping may be linear or non-linear and may include non-linear monotonic re-mapping, for example. The method then applies contrast limited adaptive histogram equalization to the conditioned volume data to generate a second volume that exhibits increased contrast. The second volume can then be displayed, stored, or transmitted to another computer or system.

Generating the second volume can be performed by defining a number of 3-D regions within the second volume and generating a uniformity index for each of the 3-D regions, where the value of the uniformity index relates to the relative texture of the volume content in the region or other suitable uniformity measure. Contrast limited adaptive histogram equalization can then be applied to each 3-D region according to its corresponding generated uniformity index.

Embodiments of the present invention can be used for improving contrast for images of a range of subjects, including the chest, limbs, extremities including weight-bearing extremities, or a portion of a dental arch.

Consistent with an embodiment of the present invention, a computer program utilizes stored instructions that perform on image data that is accessed from an electronic memory. As can be appreciated by those skilled in the image processing arts, a computer program of an embodiment of the present invention can be utilized by a suitable, general-purpose computer system, such as a personal computer or workstation. However, many other types of computer systems can be used to execute the computer program of the present invention, including an arrangement of networked processors, for example. The computer program for performing the method of the present invention may be stored in a computer readable storage medium. This medium may comprise, for example; magnetic storage media such as a magnetic disk such as a hard drive or removable device or magnetic tape; optical storage media such as an optical disc, optical tape, or machine readable optical encoding; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other network or communication medium. Those skilled in the art will further readily recognize that the equivalent of such a computer program product may also be constructed in hardware.

It should be noted that the term "memory", equivalent to "computer-accessible memory" in the context of the present disclosure, can refer to any type of temporary or more enduring data storage workspace used for storing and operating upon image data and accessible to a computer system, including a database, for example. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer is also considered to be a type of memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It will be understood that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for providing tomosynthesis 3-D volume image data, executed at least in part on a computer, comprising:
   a) acquiring a plurality of radiographic projection images of a subject over a range of angles;
   b) generating reconstructed volume image data from the acquired projection images;
   c) defining a plurality of regions of interest within the reconstructed volume image data, wherein each region of interest has a plurality of image voxels;
   d) conditioning image voxel data values within at least one of the regions of interest to enhance contrast within the at least one region of interest;
   e) adjusting the conditioned image voxel data values within the at least one of the regions of interest according to interpolation with two or more neighboring regions of interest; and
   f) displaying an image slice having at least a plurality of the adjusted image voxel data values.

2. The method of claim 1 wherein the plurality of defined regions of interest are non-overlapping.

3. The method of claim 1 wherein at least two of the defined regions of interest are overlapping.

4. The method of claim 1 wherein conditioning the image voxel data values comprises applying a constrained histogram equalization.

5. The method of claim 1 wherein defining the plurality of regions comprises accepting an operator instruction relating to the number or shape of the regions.

6. The method of claim 1 wherein defining the plurality of regions comprises defining a three-dimensional shape.

7. The method of claim 1 wherein adjusting the conditioned image voxel data values comprises accepting an operator instruction relating to a number of neighboring regions of interest used for the interpolation.

8. The method of claim 1 wherein conditioning image voxel data values comprises re-mapping at least a portion of the obtained volume data values to an expanded range of data values, and wherein the re-mapping is either a linear or a non-linear re-mapping, including a non-linear monotonic re-mapping.

9. The method of claim 1 wherein adjusting the conditioned image voxel data values comprises applying a randomization to the data from neighboring regions of interest, and wherein conditioning image voxel data values comprises applying a clipping value.

10. The method of claim 1 wherein the interpolation is conditioned by both distance and direction of the two or more neighboring regions of interest.

11. A method for processing a tomosynthesis reconstruction 3-D volume of a subject, executed at least in part on a computer, comprising:
   receiving first volume data for the reconstructed 3-D tomosynthesis volume, wherein the first volume data includes a number of values that extend within a first range;
   selecting a cutting point for the number of values within the first range to define a portion of the first volume of data to be re-mapped, thereby decreasing the number of values within the first range;
   generating conditioned volume data by re-mapping the portion of the first volume data values beyond the cutting point to a second range that is expanded over the first range of the first volume data;
   generating a second volume including increased contrast by applying contrast limited adaptive histogram equalization to the conditioned volume data; and
   displaying, storing, or transmitting the second volume in the reconstructed 3-D tomosynthesis volume.

12. The method of claim 11 wherein re-mapping comprises processing using histogram equalization, and wherein the first volume data is either pre-processed or unprocessed raw data.

13. The method of claim 11 further comprising
   obtaining image data for a plurality of 2-D projection images over a range of scan angles; and
   processing the plurality of 2-D projection images to reconstruct the 3-D volume image of the subject.

14. The method of claim 11 wherein the subject is a limb, an extremity, a weight-bearing extremity, or a portion of a dental arch.

15. The method of claim 11 wherein generating conditioned volume data applies a transformation according to an examination type.

16. A method for processing a tomosynthesis reconstruction 3-D volume of a subject, executed at least in part on a computer, comprising:
   receiving first volume data for the reconstructed 3-D tomosynthesis volume, wherein the volume data values extend within a first range;
   generating conditioned volume data by re-mapping at least a portion of the first volume data values to a second range that is expanded over the first range of the first volume data;
   generating a second volume including increased contrast by applying contrast limited adaptive histogram equalization to the conditioned volume data;
   displaying, storing, or transmitting the second volume in the reconstructed 3-D tomosynthesis volume;
   defining a plurality of 3-D regions within the second volume;
   generating a uniformity index for each of the 3-D regions in the defined plurality of 3-D regions, where the value of the uniformity index relates to the relative texture of the volume content in the region; and
   applying contrast limited adaptive histogram equalization to each 3-D region according to its corresponding generated uniformity index.

17. A method for digital radiographic 3-D volume image processing of a subject, executed at least in part on a computer and comprising:

receiving 3-D volume image data of the subject;

dividing the 3-D volume image data into a first plurality of independent 3-D regions of interest;

increasing contrast within one or more of the first plurality of 3-D regions of interest; and increasing a global contrast of the 3-D volume image by maintaining the intensity consistency among the increased contrast first plurality of 3-D regions of interest based on a spatial correlation among the first plurality of 3-D regions of interest.

18. The method of claim 17 wherein the contrast is increased in the first plurality of 3-D regions of interest using an adaptively computed intensity mapping function, wherein the adaptively computed intensity mapping function is generated using constrained local histogram stretching.

19. The method of claim 17 wherein a first increase in contrast within the first plurality of 3-D regions of interest or a second plurality of 3-D regions of interest and a second increase in global contrast of the 3-D volume image are independently controlled and are different.

20. The method of claim 17 wherein a global contrast of the 3-D volume image is increased in selectable levels of detail, wherein the selectable level controls at least a percentage of contrast increase.

* * * * *